United States Patent [19]

Linhart et al.

[11] 4,432,899
[45] Feb. 21, 1984

[54] PREPARING CONCENTRATED AZO DYE SOLUTIONS USING NITRITE SALT AS BOTH COUPLING COMPONENT AND DIAZOTIZING AGENT

[75] Inventors: Karl Linhart, Leverkusen; Harald Gleinig, Odenthal; Günther Boehmke, Leverkusen, all of Fed. Rep. of Germany

[73] Assignee: Bayer Aktiengesellschaft, Leverkusen, Fed. Rep. of Germany

[21] Appl. No.: 335,940

[22] Filed: Dec. 30, 1981

[30] Foreign Application Priority Data

Jan. 16, 1981 [DE] Fed. Rep. of Germany ....... 3101140

[51] Int. Cl.³ .................... C09B 44/02; C09B 44/04; D06P 1/41
[52] U.S. Cl. .................. 260/157; 260/152; 260/158; 260/162; 260/163; 260/205; 260/206; 260/207; 260/207.1; 260/207.5
[58] Field of Search ............ 260/154, 155, 156, 157, 260/158, 162, 163, 205, 206, 207, 207.1

[56] References Cited

U.S. PATENT DOCUMENTS

| | | | |
|---|---|---|---|
| 2,945,849 | 7/1960 | Kruckenberg et al. | 260/185 |
| 2,972,508 | 2/1961 | Kruckenberg et al. | 260/205 X |
| 3,033,847 | 5/1962 | Sartori | 260/158 |
| 3,102,879 | 9/1963 | Bawmann et al. | 260/157 |
| 3,532,683 | 10/1970 | Sartori | 260/207 |
| 3,812,093 | 5/1974 | Fisher et al. | 260/146 R |
| 3,912,708 | 10/1975 | James | 260/156 |
| 3,956,271 | 5/1976 | Blass et al. | 260/208 |
| 3,988,311 | 10/1976 | Hegar | 260/158 |
| 4,225,490 | 9/1980 | Entschel et al. | 260/156 |

FOREIGN PATENT DOCUMENTS 1162665 8/1969 United Kingdom ............... 260/158

*Primary Examiner*—Floyd D. Higel
*Attorney, Agent, or Firm*—Sprung, Horn, Kramer & Woods

[57] ABSTRACT

Concentrated, stable solutions, with a low salt content, of cationic azo dyestuffs of the formula

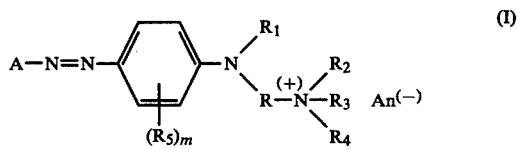

wherein
A denotes the radical of an aromatic-carbocyclic or aromatic heterocyclic diazo component,
R denotes alkylene,
$R_1$ denotes hydrogen or alkyl,
$R_2$ denotes alkyl, alkenyl or aralkyl,
$R_3$ denotes alkyl,
$R_4$ denotes hydroxyalkyl having 2 or more C atoms,
$R_5$ denotes halogen, alkyl, alkoxy, aryloxy, acyl or acylamino,
m denotes 0, 1, 2, 3 or 4, and
$An^-$ denotes a carboxylate ion,
and wherein
the cyclic and acyclic substituents can carry further non-ionic substituents,
are prepared by the reaction of amines of the formula

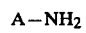

with coupling components of the formula

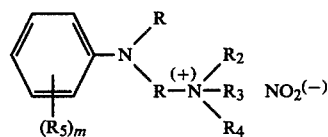

in aqueous carboxylic acids and, if appropriate, organic water-soluble solvents.

7 Claims, No Drawings

PREPARING CONCENTRATED AZO DYE SOLUTIONS USING NITRITE SALT AS BOTH COUPLING COMPONENT AND DIAZOTIZING AGENT

The present invention relates to a process for the preparation of concentrated, stable solutions, with a low salt content, of cationic azo dyestuffs of the formula

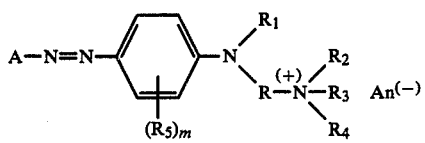

wherein
- A denotes the radical of an aromatic carbocyclic or aromatic heterocyclic diazo component,
- R denotes alkylene,
- $R_1$ denotes hydrogen or alkyl,
- $R_2$ denotes alkyl, alkenyl or aralkyl,
- $R_3$ denotes alkyl,
- $R_4$ denotes hydroxyalkyl having 2 or more C atoms,
- $R_5$ denotes halogen, alkyl, alkoxy, aryloxy, acyl or acylamino,
- m denotes 0, 1, 2, 3 or 4, and
- $An^-$ denotes a carboxylate ion, and wherein
the cyclic and acyclic substituents can carry further non-ionic substituents,
by reaction of amines of the formula

(II)
with coupling components of the formula

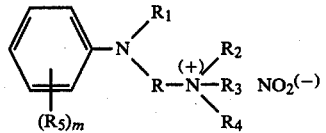

in aqueous carboxylic acids and, if appropriate, organic water-soluble solvents.

The solutions prepared in this manner preferably contain 10-60% by weight of the cationic dyestuff, 10-80% by weight of a water-soluble carboxylic acid, 0-20% by weight of a water-soluble organic solvent and 3-30% by weight of water.

Among the dyestuffs of the formula (I), those dyestuffs, the diazo component A of which represents a radical of the benzene, thiazole, benzthiazole, benzisothiazole, thiadiazole or triazole series, should be singled out.

Non-ionic substituents of the dyestuffs I are substituents which are customary in dyestuff chemistry and which do not dissociate under the preparation conditions and conditions of use, such as cyano, hydroxyl, halogen, such as fluorine, chlorine or bromine, nitro, alkyl, monoalkylamino, dialkylamino, phenyl, alkoxy, acyloxy, alkoxycarbonyl, alkoxycarbonyloxy, phenoxy, benzyloxy, sulphonamido, carboxamido, alkylsulphonyl, phenylsulphonyl, alkylmercapto or phenylmercapto.

Particularly suitable alkyl radicals are those having 1-4 C atoms.

2-Hydroxy-ethyl-propyl and 2-hydroxy-ethyl-butyl radicals which are unsubstituted or which are substituted by $C_1$-$C_4$-alkoxy, $C_2$-$C_4$-alkenyloxy, phenoxy or benzyloxy are particularly suitable radicals $R_4$.

Straight-chain and branched alkylene radicals which have 2-5 C atoms and which can be substituted are examples of suitable radicals R; for example, a methylene group can be replaced by a carbonyl group.

Optionally substituted phenyl and naphthyl radicals are particularly suitable aryl radicals.

Alkylcarbonyl and alkylsulphonyl radicals which have 1-4 C atoms in the alkyl radical, or benzoyl, are particularly suitable acyl radicals.

Dyestuffs which can preferably be prepared in this manner have the formulae

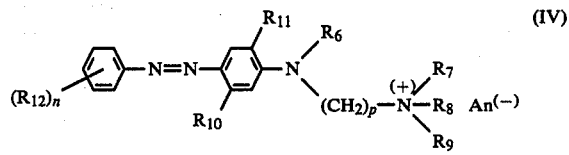

wherein
- $R_6$, $R_7$, $R_8$ and $R_9$ denote methyl, ethyl, propyl, butyl, 2-hydroxyethyl, 2-hydroxypropyl, 2-hydroxybutyl, 2-hydroxyethylphenyl, 2-hydroxy-3-methoxypropyl, 2-hydroxy-3-chloro-propyl, 2-hydroxy-3-ethoxy-propyl, 2-hydroxy-3-propoxypropyl, 2-hydroxy-3-allyloxy-propyl, 2-hydroxy-3-butoxy-propyl, 2-hydroxy-3-phenoxy-propyl, 2-hydroxy-3-benzoxy-propyl,
- $R_{10}$ denotes hydrogen, methyl, ethyl, propyl, butyl, halogen, methoxy, ethoxy, propoxy, acetylamino, propionylamino or methylsulphonylamino, $R_{11}$ denotes hydrogen, methyl, ethyl, propyl, butyl, halogen, methoxy, ethoxy or propoxy, $R_{12}$ denotes methyl, ethyl, propyl, butyl, halogen, cyano, nitro, methoxy, ethoxy, propoxy, methoxycarbonyl, ethoxycarbonyl, acetyloxy, acetyl, sulphonamido or carboxamido,
- n denotes 1 to 5,
- p denotes 2 or 3, and
- $An^-$ a carboxylate ion, and

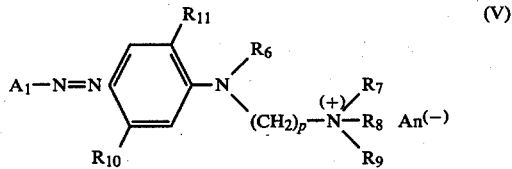

wherein
$A_1$ represents radicals of the formulae

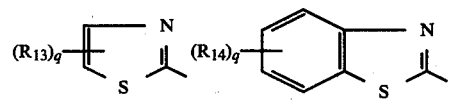

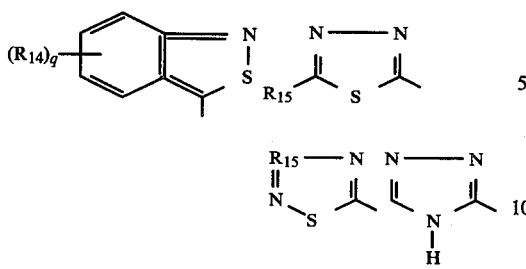

wherein
- $R_{13}$ denotes $C_1$–$C_5$-alkyl, phenyl, cyano, nitro or carbomethoxy,
- $R_{14}$ denotes $C_1$–$C_5$-alkyl, $C_1$–$C_4$-alkoxy, phenoxy, nitro, carbomethoxy or halogen
- $R_{15}$ denotes hydrogen; $C_1$–$C_5$-alkyl; $C_1$–$C_4$-alkoxy; phenoxy; cyclohexyl; phenyl; phenyl which is substituted by methyl, ethyl, methoxy, ethoxy, nitro, chlorine or acetylamino; benzyl; methyl-mercapto, ethyl-mercapto, phenyl-mercapto, benzyl-mercapto; dimethylamino, diethylamino, methylsulphonyl, ethylsulphonyl or phenylsulphonyl, and
- q denotes 0, 1 or 2, and wherein $R_6$–$R_{11}$, p and $An^-$ have the meaning given in formula IV.

Among these dyestuffs, those in which n denotes 1–3, q denotes 0 or 1, $R_6$, $R_7$ and $R_8$ denote methyl or ethyl, $R_9$ denotes 2-hydroxypropyl, $R_{10}$ and $R_{11}$ denote hydrogen or methyl, $R_{12}$ denotes chlorine, bromine, cyano or nitro, $R_{13}$, $R_{14}$ and $R_{15}$ denote hydrogen, phenyl or nitro, and $An^-$ denotes acetate are preferred.

Suitable amines II, suitable coupling components III and suitable amines of the formula

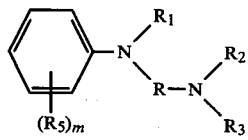

which can be converted into the coupling components III by alkoxylation, are described in U.S. Pat. No. 4,036,826.

$C_1$–$C_3$-Carboxylic acids, such as formic acid, acetic acid, propionic acid, monochloroacetic acid, dichloroacetic acid, trichloroacetic acid and lactic acid, preferably acetic acid and propionic acid, are particularly suitable water-soluble carboxylic acids.

Alcohols, such as ethanol, iso-propanol, isobutanol and n-butanol, glycols, such as ethylene glycol, propylene glycol, ethylene diglycol and ethylene triglycol, monoalkyl glycol ethers and dialkyl glycol ethers, such as methylglycol and dimethylglycol, dimethylformamide, caprolactam and methylpyrolidone are examples of organic water-soluble solvents.

The process is preferably carried out by a method in which the amine II is suspended or dissolved in the aqueous carboxylic acid, if appropriate with the addition of the organic solvent, and the mixture is cooled, for example to 0°–50° C. With the addition of the coupling component III, the simultaneous diazotisation and coupling is then carried out at 0°–50° C., in particular at room temperature. After the reaction has ended, the mixture is further stirred at temperatures below 50° C.

A further variant of the process comprises the possibility of mixing various diazo components II and a coupling component III, which together are diazotised and coupled in order to obtain a finished dyestuff solution of the desired shade.

The process according to the invention offers the surprising possibility of preparing highly concentrated, stable solutions of cationic dyestuffs, the physical stability of which is assured by the absence of inorganic salts. The solutions, which are prepared in a very simple manner, can be made available commercially, without further purification.

In spite of the lack of an intermediate isolation of the dyestuffs, which serves, in general, to remove non-coupled intermediate products or decomposition products, excellent dyeing results are obtained, which, in shade and fastness properties, do not fall below the standard which is achieved with the dyestuffs purified by processes used hitherto.

It was not evident from the state of the art that the simultaneous diazotisation and coupling is possible for carboxylic acids in high concentration, without the formation of decomposition products. In addition, no usable solution is so far available for the removal of the cation of the nitrosating agent, which cation is entrained by the nitrite. The known use of nitrites is exhibited by processes which can only be realised with great technical effort.

According to the process according to the invention, the nitrite ion, the anion of the cationic coupling component, is introduced into the reaction solution. It could not be predicted from the state of the art that the nitrite of the coupling component could be isolated and subjected to the desired reaction, without yielding side-reactions (for example p-nitrosation).

In contrast to the known nitrites, the salts of the coupling component are easily obtainable by ion exchange reactions. In addition, their manipulation is not associated with the risk of the nitrites, but is comparable with that of the sodium nitrite solution. The nitrite solutions according to the invention are particularly stable if they are rendered neutral with suitable bases, for example with NaOH or KOH, or preferably organic bases, such as triethanolamine.

By the choice of the coupling component as a substance yielding nitrousacid, and of the solvent, conditions are found which simultaneously yield a quantitative reaction to give the dyestuff, and a dyestuff solution which is almost free of inorganic salts. These advantages are not achieved if only one of the parameters mentioned is varied.

The dyestuffs of the solutions which can be prepared according to the invention are known, for example, from U.S. Pat. No. 4,036,826 and DE-OS (German Published Specification) No. 1,644,323: they are suitable, as is known, for dyeing and printing fibres, woven fabrics and fleeces, composed of polymers of acrylonitrile or 1,1-dicyanoethylene, or copolymers of these components with other vinyl compounds, such as vinyl chloride, vinylidene chloride, vinyl acetate, vinyl pyridine, vinyl imidazole, acrylates and methacrylates; or of acid-modified polyesters, as described, for example, in U.S. Pat. No. 2,893,816, 3,018,272 and 3,166,531, and of acid-modified polyamides, as described, for example, in U.S. Pat. Nos. 3,039,009 and 3,454,351.

In addition, cellulose fibres and lignin-containing fibre materials, as used for the manufacture of fleeces, absorptive papers and sized writing papers and packaging papers, can also be dyed in outstandingly light-fast shades, using these dyestuffs. The good absorbtion is particularly surprising, the dyestuffs being completely absorbed, even at the liquor ratios of 1:100–1,000 which are customary in paper manufacture, and yielding an almost colourless waste liquor.

It is known that certain azo dyestuffs can be prepared by one-stage diazotisation/coupling processes.

A one-stage process for the preparation of water-insoluble pigments is described in U.S. Pat. No. 2,478,768, in which process the diazotisation and coupling are carried out at a pH value <6. In this process, water-insoluble Ba salts of the azo dyestuffs are prevented from undergoing further side-reactions by continuous precipitation. A similar process is described in U.S. Pat. No. 2,478,767, in which process diazotisation and coupling are kept in the pH range between pH 6.0 and 7.2.

A process is described in U.S. Pat. No. 2,418,416, in which process the diazotisation is effected at pH <4 and the coupling at pH >4. Such a process can lead to the decomposition of a part of the diazo compound before the coupling.

A process is described, in DE-OS (German Published Specification) No. 1,927,453, for the preparation of metal-free azo pigments by diazotisation and coupling in organic solvents which contain at most 10% of water. This process proceeds in a heterogeneous phase.

DE-OS (German Published Specification) No. 2,058,299 describes a similar process which differs in that the reaction mixture is anhydrous and an organic acid with a pH value <3 is added in a quantity of <1 mol, relative to 1 mol of amine. Due to the reaction being carried out in an anhydrous medium, it is necessary to employ esters of nitrous acid. These must be separately prepared and manipulated with the greatest precautions, whilst the solutions of the nitrites of the coupling components, similarly to sodium nitrite solutions, are not dangerous.

A process is described, in DE-AS (German Published Specification) No. 2,139,311, for the one-stage preparation of azo dyestuffs, the pH value for diazotisation and coupling being 4 or lower, if the reaction mixture is diluted with a quantity of water corresponding to 25% of the volume of the mixture. In the examples, quantities of 17–127 mols of acetic acid per mol of amine are used, whereby these processes cannot be used for the preparation of concentrated fluid grades.

British Pat. No. 2,009,208 A describes the simultaneous diazotisation and coupling of coupling components, substituted by pyridinium chloride, in acetic acid and ethylene glycol, at a pH value of 2.8, if the reaction mixture is diluted with 25% of water. A separation of the inorganic salts by filtration is not possible.

In British Pat. No. 1,162,665, diazotisation and coupling are carried out in acid solution, and the dyestuffs are salted out or are isolated as the ZnCl$_2$ double salt.

The percent data of the formulations of the examples refer to aqueous formulations.

EXAMPLE 1

479 g of N-ethyl-N-(dimethyl-hydroxy-propylammonium)-ethyl-aniline sulphate (62.4% strength) (=1 mol) are initially introduced, and the pH is adjusted to 6.9–7 with 5.5–6 g of triethanolamine. 230 ml of sodium nitrite solution (30% strength) (=1 mol) are added to the mixture, and the latter is stirred for a short time. The mixture is allowed to stand for approximately 5 minutes, without stirring, until phase separation occurs. The lower phase is colourless and clear and contains virtually only sodium sulphate. It is discharged. 221.7 g of 2-chloro-4-nitroaniline (76.25% strength) (=0.98 mol), 200 g of glacial acetic acid and 97.5 g of 6-caprolactam are initially introduced into another flask and cooled to 8° C. The N-ethyl-N-(dimethyl-hydroxypropylammonium)-ethyl-aniline nitrite solution obtained by the process described above is allowed to run into the mixture during the course of 4 hours. During this operation, the temperature is kept at 8°–2° C. The mixture is further stirred overnight, without cooling, and is clarified (clarifying press with cloth/paper/cloth) next morning, after cooling to 2° C., no significant residue occurring. After the clarification, a stable solution of a red dyestuff of the formula

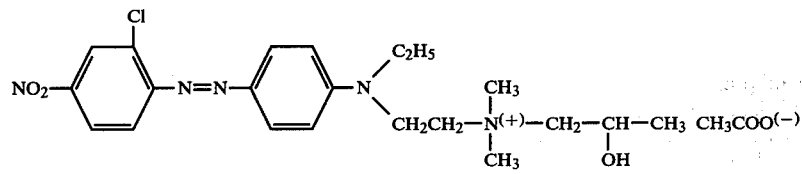

is obtained.
Yield: 1,070 g.

EXAMPLE 2

305.3 g of p-chloro-o-nitroaniline (56% strength) (=1 mol), 200 ml of glacial acetic acid and 97.5 g of 6-caprolactam are initially introduced into a flask and cooled to 10° C. The N-ethyl-N-(dimethyl-hydroxypropyl-ammonium)-ethyl-aniline nitrite solution obtained according to Example 1 is allowed to run into the mixture during the course of 4 hours. The temperature is not allowed to exceed 10° C. during this operation. The mixture is further stirred overnight and is clarified next morning. No significant residue is formed thereby. A yellow dyestuff solution is obtained after the clarification.

EXAMPLE 3

113.1 g of o-chloro-p-nitroaniline (75% strength) (=0.5 mol), 152.65 g of p-chloro-o-nitroaniline (56.5% strength) (=0.5 mol), 200 ml of glacial acetic acid and 97.5 g of 6-caprolactam are initially introduced into a flask and cooled to 10° C. The N-ethyl-N-(dimethylhydroxy-propyl-ammonium)-ethyl-aniline nitrite solution obtained according to Example 1 is allowed to run into the mixture during the course of 4 hours. The temperature is not allowed to exceed 10° C. during this operation. The mixture is further stirred overnight and is clarified next morning. No significant residue is formed thereby. An orange-coloured dyestuff solution is obtained after the clarification.

EXAMPLE 4

260 g of 2,4,5-trichloroaniline (75.5% strength) (=1 mol), 200 ml of glacial acetic acid and 97.5 g of 6-caprolactam are initially introduced into a flask and cooled to 10° C. The N-ethyl-N-(dimethyl-hydroxypropyl-ammonium)-ethyl-aniline nitrite solution obtained according to Example 1 is allowed to run into the mixture during the course of 4 hours. The temperature is not allowed to exceed 10° C. during this operation. The mixture is further stirred overnight and is clarified next morning. No significant residue is formed thereby. A yellow dyestuff solution is obtained after the clarification.

EXAMPLE 5

84 g of 3-amino-1,2,4-triazole (=1 mol), 200 ml of glacial acetic acid and 97.5 g of 6-caprolactam are dissolved, at 60° C., in a flask and cooled to 10° C. The N-ethyl-N-(dimethyl-hydroxy-propyl-ammonium)-ethylaniline nitrite solution obtained according to Example 1 is allowed to run into the mixture during the course of 4 hours. The temperature is not allowed to exceed 10° C. during this operation. The mixture is further stirred overnight and is clarified next morning. No significant residue is formed thereby. This solution can be directly further quaternised, which leads to a significant improvement in the tinctorial strength. An orange-coloured dyestuff solution is obtained after the clarification.

EXAMPLE 6

176 g of p-nitroaniline (78.3% strength) (=1 mol), 200 ml of glacial acetic acid and 100 g of 6-caprolactam are initially introduced into a flask and cooled to 10° C. The N-ethyl-N-(dimethyl-hydroxy-propyl-ammonium)-ethyl-aniline nitrite solution obtained according to Example 1 is allowed to run into the mixture during the course of 4 hours. The temperature is not allowed to exceed 10° C. The mixture is further stirred overnight and is clarified next morning. No significant residue is formed thereby. A red dyestuff solution is obtained after the clarification.

EXAMPLE 7

171.5 g of 3-phenyl-5-amino-1,2,4-thiadiazole (98.5% strength) (=1 mol), 200 ml of glacial acetic acid and 300 g of ethylene glycol are stirred together and cooled to 5° C. The N-ethyl-N-(dimethyl-hydroxy-propyl-ammonium)-ethyl-aniline nitrite solution obtained according to Example 1 is allowed to run into the mixture during the course of 4 hours. During this operation, the temperatures should be between 5° and 10° C. The mixture is further stirred overnight at room temperature and is clarified next morning. No significant residue is formed thereby. A red dyestuff solution is obtained after the clarification.

EXAMPLE 8

186.7 g of 6-methoxy-2-aminobenzthiazole (96.4% strength) (=1 mol) and 400 ml of glacial acetic acid are initially introduced into a flask and warmed to 50° C. A clear solution is formed. The solution is then cooled to 15° C. and the N-ethyl-N-(dimethyl-hydroxy-propyl-ammonium)-ethyl-aniline nitrite solution obtained according to Example 1 is allowed to run in during the course of 4 hours. The mixture is further stirred for 60 minutes and is clarified. No significant residue is formed thereby. A stable, red dyestuff solution is obtained.

This solution can be further quaternised; a blue dyestuff of high tinctorial strength is then obtained. Dimethyl sulphate or benzyl chloride is employed, for example, as the quaternising agent.

EXAMPLE 9

168 g of 5-nitro-2-amino-benzonitrile (97% strength) (=1 mol), 800 ml of glacial acetic acid and 5 g of nonylphenol and 10 mols of ethylene oxide are initially introduced into a flask and are stirred at 60° C. The N-ethyl-N-(dimethyl-hydroxypropylammonium)-ethyl-aniline nitrite solution obtained according to Example 1 is allowed to run into the mixture at 25° C., during the course of 2 hours. 500 ml of acetic acid/water are then distilled off in vacuo (approximately 15 mm Hg) at 22°–30° C., and the pH value of the mixture is then adjusted, using approximately 100 ml of triethanolamine, from 4.5 to 6. A stable solution of a red dyestuff is obtained after clarification.

We claim:

1. Process for the preparation of a concentrated, stable solution, with a low salt content, of a cationic azo dyestuff of the formula

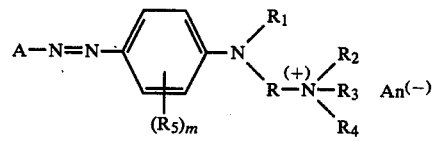

wherein
A denotes the radical of an aromatic carbocyclic or aromatic heterocyclic diazo component,
R denotes alkylene,
$R_1$ denotes hydrogen or alkyl,
$R_2$ denotes alkyl, alkenyl or aralkyl,
$R_3$ denotes alkyl,
$R_4$ denotes hydroxyalkyl having 2 or more C atoms,
$R_5$ denotes halogen, alkyl, alkoxy, aryloxy, $C_1$–$C_4$-alkylcarbonyl, $C_1$–$C_4$-alkylsulphonyl, benzoyl, $C_1$–$C_4$-alkylcarbonylamino, $C_1$–$C_4$-alkylsulphonylamino or benzoylamino,
m denotes 0, 1, 2, 3 or 4, and
$An^-$ denotes a carboxylic ion,
and wherein
the cyclic and acyclic substituents are unsubstituted or substituted by non ionic substituents,
comprising reacting an amine of the formula $$A-NH_2$$

with a nitrite of the formula

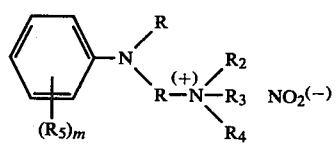

in an aqueous carboxylic acid in a concentration such that the final solution has a dyestuff concentration of from 10 to 60% by weight.

2. Process according to claim 1, characterised in that solutions are prepared, which contain 10-60% by weight of the cationic dyestuff, 10-80% by weight of the water-soluble carboxylic acid, 0-20% by weight of a water-soluble organic solvent and 3-30% by weight of water.

3. Process according to claim 1, characterised in that the reactants are employed in equimolar quantities.

4. Process according to claim 2, characterised in that acetic acid is used as the carboxylic acid and, ethylene glycol or caprolactam is used as the organic solvent.

5. Process according to claim 1, characterized in that the nitrite is obtained by double decomposition of the quaternary salt of another acid with an alkali metal or alkaline earth metal nitrite and separation of the by-product salt.

6. Process according to claim 1, wherein the reactants are of the formulas which produce a dyestuff of the formula

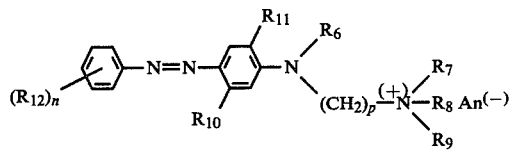

wherein $R_6$, $R_7$, $R_8$ and $R_9$ denote methyl, ethyl, propyl, butyl, 2-hydroxyethyl, 2-hydroxypropyl, 2-hydroxybutyl, 2-hydroxyethylphenyl, 2-hydroxy-3-methoxypropyl, 2-hydroxy-3-chloro-propyl, 2-hydroxy-3-ethoxy-propyl, 2-hydroxy-3-propoxypropyl, 2-hydroxy-3-allyloxy-propyl, 2-hydroxy-3-butoxypropyl, 2-hydroxy-3-phenoxy-propyl, 2-hydroxy-3-benzoxy-propyl, $R_{10}$ denotes hydrogen, methyl, ethyl, propyl, butyl, halogen, methoxy, ethoxy, propoxy, acetylamino, propionylamino or methylsulphonylamino, $R_{11}$ denotes hydrogen, methyl, ethyl, propyl, butyl, halogen, methoxy, ethoxy or propoxy, $R_{12}$ denotes methyl, ethyl, propyl, butyl, halogen, cyano, nitro, methoxy, ethoxy, propoxy, methoxycarbonyl, ethoxycarbonyl, acetyloxy, acetyl, sulphonamido or carboxamido, n denotes 1 to 5, p denotes 2 or 3, and $An^-$ denotes a carboxylate ion.

7. Process according to claim 1, wherein the reactants are of the formulas which produce a dyestuff of the formula

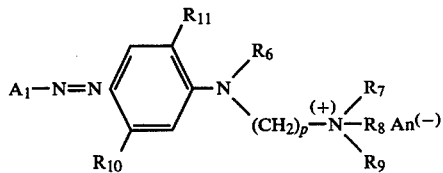

wherein $R_6$, $R_7$, $R_8$ and $R_9$ denote methyl, ethyl, propyl, butyl, 2-hydroxyethyl, 2-hydroxypropyl, 2-hydroxybutyl, 2-hydroxyethylphenyl, 2-hydroxy-3-methoxypropyl, 2-hydroxy-3-chloro-propyl, 2-hydroxy-3-ethoxy-propyl, 2-hydroxy-3-propoxypropyl, 2-hydroxy-3-allyloxy-propyl, 2-hydroxy-3-butoxypropyl, 2-hydroxy-3-phenoxy-propyl, 2-hydroxy-3-benzoxy-propyl.

$R_{10}$ denotes hydrogen, methyl, ethyl, propyl, butyl, halogen, methoxy, ethoxy, propoxy, acetylamino, propionylamino or methylsulphonylamino, $R_{11}$ denotes hydrogen, methyl, ethyl, propyl, butyl, halogen, methoxy, ethoxy or propoxy, p denotes 2 or 3, $An^-$ a carboxylate ion, $A_1$ represents a radical of the formulae

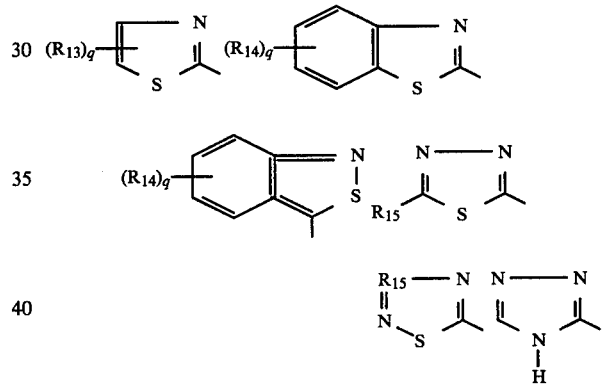

wherein $R_{13}$ denotes $C_1$-$C_5$-alkyl, phenyl, cyano, nitro or carbomethoxy, $R_{14}$ denotes $C_1$-$C_5$-alkyl, $C_1$-$C_4$-alkoxy, phenoxy, nitro, carbomethoxy or halogen $R_{15}$ denotes hydrogen; $C_1$-$C_5$-alkyl; $C_1$-$C_4$-alkoxy; phenoxy; cyclohexyl; phenyl; phenyl which is substituted by methyl, ethyl, methoxy, ethoxy, nitro, chlorine or acetylamino; benzyl; methylmercapto, ethyl-mercapto, phenyl-mercapto, benzyl-mercapto; dimethylamino, diethylamino, methylsulphonyl, ethylsulphonyl or phenylsulphonyl, and q denotes 0, 1 or 2.

* * * * *

UNITED STATES PATENT AND TRADEMARK OFFICE
CERTIFICATE OF CORRECTION

PATENT NO. : 4,432,899

DATED : February 21, 1984

INVENTOR(S) : Karl Linhart et al

It is certified that error appears in the above-identified patent and that said Letters Patent is hereby corrected as shown below:

Under "U.S. Patent Documents"   4th line, delete "Bawmann" and substitute --Baumann--

Col. 8, line 60   Middle of formula delete

" 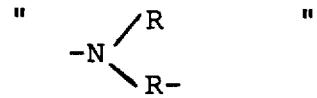 "

and substitute

-- 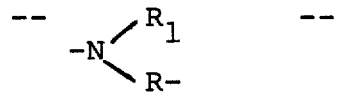 --

Col. 10, line 18   After "propyl" delete "." and substitute -- , --

Signed and Sealed this

Twenty-second Day of May 1984

[SEAL]

Attest:

Attesting Officer

GERALD J. MOSSINGHOFF

Commissioner of Patents and Trademarks